Feb. 6, 1962 M. SOLOMON 3,020,091
WHEEL WITH WHITE SIDE WALL
Filed July 19, 1960
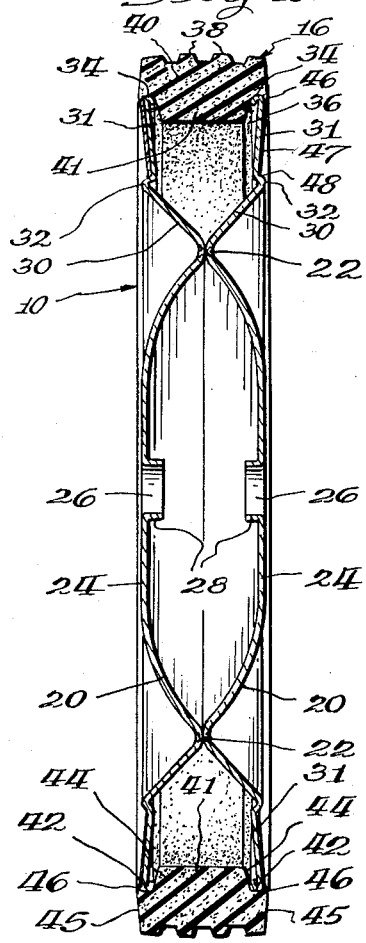
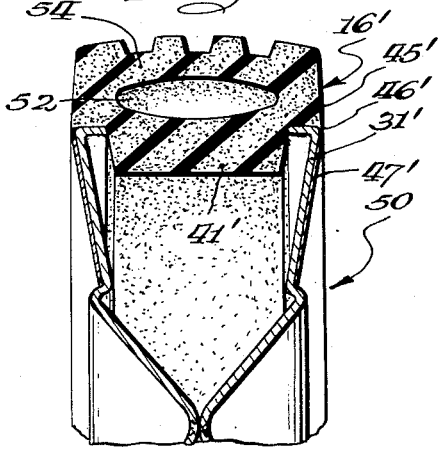
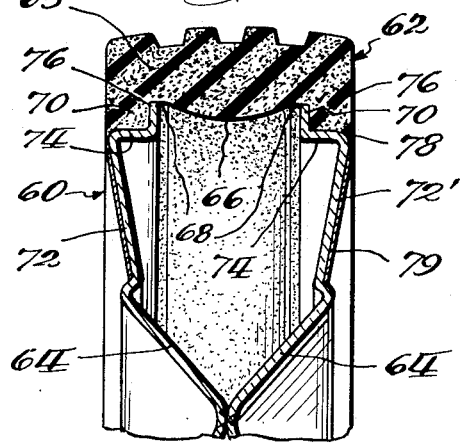
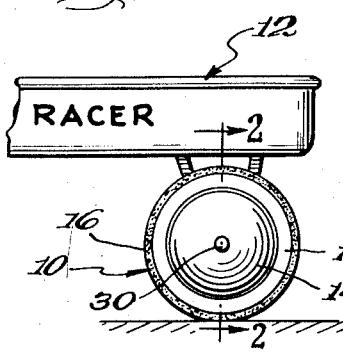
INVENTOR.
Milton Solomon
BY
Silverman, Mueller Cass
attorneys

United States Patent Office 3,020,091
Patented Feb. 6, 1962

3,020,091
WHEEL WITH WHITE SIDE WALL
Milton Solomon, Chicago, Ill., assignor to International Wheel Corporation, a corporation of Illinois
Filed July 19, 1960, Ser. No. 43,867
4 Claims. (Cl. 301—63)

This invention relates generally to improvements in wheel structures and more particularly, relates to an improved wheel construction of the character described adapted to have a white side-wall annular area and means for delineating said annular area to achieve a highly distinctive and unique wheel construction and a tire mounting structure to achieve the objects set out hereinafter.

The type of wheel with which the invention is concerned is intended for use on small vehicles such as, children's wagons and cars and the like, lawn mowers, household utility carts and numerous other small vehicles of like character. Such wheels range generally between approximately five inches to twelve inches in diameter and include, a wheel body having a bearing at the center thereof for a wheel axle and a peripheral seat for a tire which may or may not be of pneumatic type. As compared to wheel structures used for automobiles, for instance, wheels of the type herein involved are relatively inexpensive and simple in construction. Characteristically, the herein wheel structures have lacked unique and distinctive styling intended to create the impression of expensive workmanship and high quality product.

Automobiles of high price have included tires on their wheels which are provided with so-called white side-walls. This involves adding white rubber side walls to the tires, and the result is a neat and desirable appearance, especially when the side-walls are newly cleaned. The price of such a tire is greater than those which are formed of the same black rubber throughout, and the buying public has thus come to consider white side-walls as a symbol of high quality and has come to demand them even on lower priced automobiles, being willing to pay a premium over the price of the automobile with the normal tires.

During the recent war, the demand for white side-walled tires was still at a high level, and since the rubber required to make the white side-walled tires was difficult to get, or manufacturers were not permitted to manufacture large quantities because of restrictions, substitutions appeared on the market. Various inserts and ornamental wheel discs of metal, plastic and the like appeared on the market to satisfy the demand for the white side-walled tires. These substitutes have for the most part disappeared, but there are still some forms available for those that cannot afford the tires themselves.

In the small wheel industry, this trend toward white side-wall tires has also existed, but has not been satisfied for a variety of reasons. The primary reason has been that the cost of adding a side-wall of white rubber is quite expensive, and the vehicles upon which such tires are used would, by the addition of such tires, be increased in value all out of proportion to the value of the entire article. Some wheels have been manufactured wherein the entire tire is of white rubber, but these wheels are quite expensive, when compared to the cost of the wheels which are contemplated by this invention. Others have attempted to paint the discs of the wheels, but the results have been not much more than to achieve a wheel with an annular white band thereon.

The primary object of the invention is to provide a small wheel structure in which the body of the wheel is formed of a pair of metal discs secured together, and having a journal for mounting the wheel upon the axle, and in which the wheel is so constructed as to enable a white band of paint to be applied to the wheel and give the wheel an appearance which creates the impression that the wheel actually has a white side-walled tire mounted thereon.

A further object of the invention is to provide a wheel structure in which the tire which is secured to the wheel is of very narrow radial dimension, which results in great economy, but which does not detract from the distinctive and pleasing appearance of the wheel.

In connection with the object stated immediately above, the conventional small dimension wheel has in the past required a thick rubber tire, that is, one which has a radial dimension that is a substantial fraction of the radius of the wheel. This has been to avoid the appearance that the wheel is of extremely low cost and to satisfy the user that the wheel tire will wear. As a rule, such tires, even if very substantially thinner than used, will outlast the vehicle, but the impression on the user is a prime factor in the sales of the vehicles, and a preference is shown for larger tires. The invention herein makes it feasible to have the wheel look like the tire extends a substantial radial distance inward, and this enables a very thin rubber tire to be used with resulting economy.

Other objects of the invention are to provide novel means for mounting the tire on the wheel, to provide a wheel structure which enables the wheel to be easily painted, and to provide a wheel structure that is easily manufactured with high speed mass production methods.

An object of the invention is to provide a wheel having a white side wall annular area and a tire mounted on the wheel, said wheel having a peripheral recess for seating the tire therein with a lateral surface of the tire body intimately blending with rim of the wheel so that said annular area appears to be a white side-wall of the tire whereby the wheel appears to have a white side-wall tire mounted thereon to create the impression of a distinctive and expensive-looking wheel structure.

An important object of the invention is to provide a wheel of the character described having novel means for forming said white side-wall annular area thereon economically and with satisfactory rapidity of production and which serve also to strengthen the entire side wall of the wheel.

The herein wheel structures have heretofore presented considerable difficulty in connection with obtaining long lasting wear of the tires thereon. It has been common for a sharp edge of the rim of the wheel to bite into and cut the tire body, especially during turning of the vehicle. It is an important object of the invention to provide a wheel structure of the character described having means for preventing undesirable mutilation of and damage to the tire body under the aforesaid circumstances.

Other objects of the invention will be seen to reside in the highly economical construction for the wheel embodying the invention, the strength and durability thereof and the very attractive appearance of the wheel which normally would be expected of more expensive and complicated wheel constructions.

Another object of the invention is to provide a wheel of the character described which is constructed to permit use of several different types of tires without sacrificing any of the aforesaid advantages.

The foregoing and other objects of the invention will become apparent as the disclosure thereof evolves. The invention has been disclosed in detail in the accompanying specification and drawing and minor variations in the size, arrangement, construction and proportion of the several parts thereof may occur to the skilled artisan without departing from the scope or sacrificing any of the advantages thereof.

In the drawing:
FIG. 1 is a side elevational view of the wheel structure embodying the invention, said wheel illustrated on a wagon, shown partially, as representative generally of the type of small vehicle on which the said wheel is intended to be used with great advantage.

FIG. 2 is a sectional view taken through said wheel along the line 2—2 of FIG. 1 and in the direction indicated generally.

FIG. 3 is a fragmentary sectional view taken along a transverse plane through a modified form of the wheel embodying the invention.

FIG. 4 is a view similar to FIG. 3 taken through a second modified form of the said wheel.

Referring now to the drawing, the reference character 10 designates generally the wheel structure embodying the invention. The wheel 10 is illustrated in FIG. 1 mounted on a child's wagon, shown partially at 12, said wagon intended to be representative of the type of small vehicle with which the wheel 10 is intended to be used with particular advantage. The body 14 of the wheel carries a tire 16 on the periphery or rim thereof. It appears from FIG. 1 that the tire 16 has an annular white side-wall area 18 which in conjunction with the tire 16 creates the illusion that the tire 16 is a large and expensive white side-wall member. As will be explained, this illusion of a white-wall tire being mounted on the wheel body 14 results from the cooperation of the component parts of the wheel 10 whereas in fact, the body of the tire 16, actually visible in a side elevational view of the wheel 10 is substantially narrower. As a result, the wheel 10 has a distinctive and expensive-looking appearance notwithstanding its very economical manufacture.

The wheel body 14 is formed generally of a pair of substantially identical circular metal plate members 20 assembled back-to-back and secured together along engaging inner surfaces thereof by spot-welding 22, for instance, to form a substantially hollow wheel body 14 with plates 20 forming the side walls of the body. Preferably, the plates 20 are sheet metal stampings capable of being stamped to their desired configuration by well known, high-speed presses. Each plate 20 has a medial, outwardly extending annular bulge 24 at the center of which is provided a bearing opening 26 surrounded by the inwardly turned annular flange 28 for journalling of a wheel axle 30 (FIG. 1). Radially outward of the bulges 24, the plates 20 have divergent inclined sections 30, each of which is connected to the planar or flat annular wall 31 which corresponds to the annular area 18 seen in FIG. 1. The annular wall 31 and the section 30 of each plate 20 are connected by a circular bead formation 32 of a special cross-sectional configuration for reasons subsequently to be explained. At the rim of the wheel body, each annular wall 31 is return-bent inwardly to provide the peripheral flange 34. The walls 31 and sections 30 of the plates 20 are spaced apart and arranged to define an annular recess 36 around the perimeter of the wheel body 14 for the tire 16.

The tire 16 is formed of a suitable resilient material such as natural or synthetic rubber and may be provided with traction treads 38 on the crown of the tire body 40. The inner circumference of the tire body 40 has a reduced dimension tapered extension 41 which provides for the shoulders 42 on opposite sides of the tire body 40. The opposite lateral surfaces 44 of the extension 41 may be convergent toward the center of the tire. As seen in FIG. 2, the tire body 40 is mounted on the wheel 10 with the reduced dimension extension 41 received in the recess 36 and the shoulders 42 supported upon the flanges 34. Also, the inner facing surfaces of the flanges 34 frictionally engage against the lateral surfaces 44. It will be seen that the smooth surfaces of the flanges 34 will not tear into the tire body even during turning of the vehicle on which the wheel 10 is mounted. Only the edge of tire body 40 is visible from a side elevational view of the wheel 10 since the extension 41 is in the recess 36 hidden from view. Thus, only a relative thin portion of the tire 16 actually is visible from exterior of the wheel.

The juncture of the shoulders 42 with the flanges 34 is very intimate and formed to effect a blending of the side walls 45 of the tire body with the annular walls 31 of the wheel. To achieve this, the side walls 45 of the tire body 40 may be formed with very thin marginal lips 46 which snugly engage against the walls 31 to substantially hide the juncture between the shoulders 44 and the flanges 34. As a result, the walls 31 of the wheel appear to be a continuation of the side walls 45 of the tire body.

To create the illusion of a white side wall tire on the wheel 10, the exterior surface of a wall 31 is painted or otherwise colored white as illustrated by the layer 47 of paint in FIG. 2. It will be appreciated that only one of the plates 20 will require such treatment since the other plate 20 will face inwardly out of view when the wheel 10 is installed. The precise procedure for forming a white annular wall area on the wheel body may vary considerably. However, in any case, the bead 32 provides an efficient and exacting guide means for coating the wall 31. As seen in FIG. 2, the juncture 48 of the bead 32 with wall 31 preferably is a sharp one whereas the apex of the bead may be more gently curved in comparison. This sharp juncture 48 enables a suitable brush, spray head or roller to be guided over the surface of wall 31 to apply the coating 47 without running the coating into the section 30. Thus, the inner limits of the annular wall area 31 considered radially of the wheel body can be sharply and rapidly defined whereas there is no critical concern for the outer limits of the area 31 since the coating 47 can be applied even over the flange 34. With the coating 47 applied, the white annular wall area 31 appears as a continuation of the tire body 40 and creates the impression that the tire 16 actually has a white side wall. The resultant effect is a distinctive and expensive looking wheel 10 having a white side wall tire thereon. It will thus be appreciated that the bead 32 enables the white side wall area 31 to be provided most economically while at the same time substantially strengthening the entire side wall of the wheel body.

The bead 32 serves at least three functions. As stated above, it enables a delineation of the white painted annular area from the remainder of the wheel, and thus makes it a simple matter to apply the white coating. Any method of coating, whether by simple hand painting or by high speed masking, spraying, rolling or the like is easier because the bead prevents the paint from running onto any other part of the wheel and marks the exact location of the color application. The second purpose which is mentioned above is the strengthening of the wheel. The provision of an annular ridge in the wheel decreases the tendency of the wheel to warp or distort, and gives strength of a rib. The third function of the ridge is rather difficult to see in the illustrations herein. The presence of the bead 32 produces shadows or an optical effect which seems to emphasize the difference in curvature between the area 18 and the area 30 thereby heightening the effect that the wheel has a tire provided with white side walls.

Referring to FIG. 3, a modified form of the invention of which pertinent parts for purposes of discussion have been illustrated is designated generally by the reference character 50. The wheel 50 is identical to the wheel 10 except that the tire 16' is of the pneumatic type. This is accomplished by forming a continous annular chamber 52 in the body 54 of the tire 16'. It will be noted that tire body 54 also has the thin lip 46' which engages against the annular side wall 31' to effect intimate blending of the lateral surface 45' of the tire body with said wall 31'. The same illusion of a white side wall pneumatic tire carried on the wheel 50 is created.

Referring to FIG. 4, another modified form of the invention is illustrated as to pertinent parts thereof and designated generally by the reference character 60. The material differences in construction of the wheel 60 are in connection with the tire 62 and the flange formations provided on the side plates 64 for engaging and supporting the tire 62. Tire body 65 of the tire 62 is of substantially less mass than that of either tire 16 or tire 16' since there is no extension similar to the extension 41 or 41'. Instead, the configuration of the inner circumference of the tire 62 is substantially channel shaped. There is a medial bulge 66 of gentle curvature flanked by the annular flat seats 68 and the extensions 70. The annular side wall areas 72 of plates 64 corresponding to side wall areas 31 each having a substantially right angle flange at their outer edge formed by the leg 74 which is substantially parallel to the axis of the wheel and the leg 76 which is substantially normal to the leg 74. When mounted on wheel 60, the tire 62 has its extensions 70 supported on the flange legs 74 with the flange legs 76 received against the seats 68 and engaged against the inner lateral surfaces of the extensions 70. Lips 78 are provided on the tire body 65 to conceal the juncture of the tire with the wheel body. The outer surface of the annular wall 72' is painted or coated white as indicated at 79 to achieve the illusion of a white side wall tire carried on the wheel 60.

It is believed that the invention has been described in sufficient detail to enable the skilled artisan to understand and practice the same. The invention has been pointed out in the appended claims in language intended to be broadly construed commensurate with the advance contributed thereby.

What it is desired to secure by Letters Patent of the United States is:

1. A wheel structure of the character described comprising a pair of circular discs fastened face to face and having their circumferential edges spaced apart and providing a peripheral recess, a tire member seated in said recess and having a relatively narrow, circumferential body portion protruding beyond the marginal rim of the wheel body, at least one disc having a central annular area and a planar annular area adjacent the circumferential edge thereof, an outwardly protruding annular bead defining the radially inward edge of the planar area, and a third annular area connecting the central annular area and the planar area, said planar area having a coating of white coloring applied thereto to give the illusion that same forms a radial continuation of the tire, said bead being connected between said planar area and third annular area along a sharply curved line of juncture, said planar area extending inwardly from the side wall of the tire at a relatively small angle relative to said side wall.

2. A wheel structure of the character described comprising a pair of circular discs fastened face to face and having their circumferential edges spaced apart and providing a peripheral recess, a tire member seated in said recess and having a relatively narrow, circumferential body portion protruding beyond the marginal rim of the wheel body, said body portion having a lateral edge substantially normal to the transverse axis of the wheel, one disc having a central annular area and a planar annular area adjacent the circumferential edge thereof, an outwardly protruding annular bead defining the radially inward edge of the planar area, and a third annular area connecting the central annular area and the planar area, said one plate having a planar area provided with a coating of white coloring to give the illusion that same forms a radial white wall continuation of the tire, said body portion having a relatively thin annular lip depending therefrom and overlying the circumferential edge of said one plate.

3. A wheel structure comprising, a wheel body having a pair of similar circular metal plates secured together face to face with their circumferential edges spaced apart to provide a peripheral recess, a tire member seated in said recess and having a relatively narrow circumferential body portion protruding beyond the marginal rim of the wheel body, each plate having a central annular area of convex configuration having a bearing for a wheel axle and a planar area spaced from said central area and contiguous to the circumferential edge of said one plate, a third annular area between said central area and planar area and an annular outwardly curved bead connecting the planar area and said third area along a sharply curved line of juncture, one plate having said planar area thereof having a white coating applied to the exterior surface thereof to give the illusion that said surface forms a white wall radial continuation of the tire body portion.

4. A wheel structure as defined in claim 3 in which said tire body portion has a thin circular lip overlying the circumferential edge of said one plate.

References Cited in the file of this patent

UNITED STATES PATENTS

| | | |
|---|---|---|
| 1,534,545 | Rogers | Apr. 21, 1925 |
| 2,280,568 | Brown | Apr. 21, 1942 |
| 2,692,801 | Rosenberg | Oct. 26, 1954 |